United States Patent
Couvreur et al.

(10) Patent No.: US 10,590,976 B2
(45) Date of Patent: Mar. 17, 2020

(54) ANCHOR FOR HARDENABLE COMPOUND

(71) Applicant: Illinois Tool Works Inc., Glenview, IL (US)

(72) Inventors: Jérôme Couvreur, Genissieux (FR); Jean-Luc Simonin, Barcelonne (FR); Jean-Paul Marasco, Soyons (FR)

(73) Assignee: ILLINOIS TOOL WORKS INC., Glenview, IL (US)

( * ) Notice: Subject to any disclaimer, the term of this patent is extended or adjusted under 35 U.S.C. 154(b) by 174 days.

(21) Appl. No.: 15/578,102

(22) PCT Filed: Aug. 31, 2016

(86) PCT No.: PCT/US2016/049675
§ 371 (c)(1),
(2) Date: Nov. 29, 2017

(87) PCT Pub. No.: WO2017/058451
PCT Pub. Date: Apr. 6, 2017

(65) Prior Publication Data
US 2018/0149182 A1    May 31, 2018

(30) Foreign Application Priority Data
Sep. 29, 2015  (FR) ..................... 15 59172

(51) Int. Cl.
*F16B 13/08* (2006.01)
*F16B 13/14* (2006.01)

(52) U.S. Cl.
CPC ........ *F16B 13/0833* (2013.01); *F16B 13/141* (2013.01); *F16B 13/08* (2013.01)

(58) Field of Classification Search
CPC .. F16B 13/0833; F16B 13/122; F16B 13/124; F16B 13/128; F16B 13/141; F16B 13/144; F16B 19/1081; F16B 19/109; F16B 13/08
(Continued)

(56) References Cited

U.S. PATENT DOCUMENTS

| | | | | |
|---|---|---|---|---|
| 2,092,341 A | * | 9/1937 | De Vries | F16B 13/143 248/231.91 |
| 3,108,443 A | * | 10/1963 | Fritz | E21D 20/025 206/206 |

(Continued)

FOREIGN PATENT DOCUMENTS

| | | |
|---|---|---|
| FR | 2 896 283 | 7/2007 |
| FR | 2 903 742 | 1/2008 |

(Continued)

OTHER PUBLICATIONS

International Search Report and Written Opinion from International Patent Application No. PCT/US2016/049675, dated Nov. 2, 2016 (9 pages).

(Continued)

*Primary Examiner* — Roberta S Delisle
(74) *Attorney, Agent, or Firm* — Neal, Gerber & Eisenberg LLP

(57) ABSTRACT

Anchor for fastening a component to a hollow or solid support material, said anchor comprising a sheath of elongate shape that is intended to be introduced into a hole in said support material, said anchor also comprising a bearing mechanism for bearing against an external face of said support material, situated at a first longitudinal end of said sheath, and a piston member situated at a second, opposite longitudinal end of said sheath and configured to engage with a screw intended to be introduced into said sheath, (Continued)

characterized in that said piston member is configured to be moved longitudinally inside said sheath by said screw.

29 Claims, 6 Drawing Sheets

(58) Field of Classification Search
USPC .............................. 411/44, 59, 60.2, 82, 82.3
See application file for complete search history.

(56) References Cited

U.S. PATENT DOCUMENTS

| | | | |
|---|---|---|---|
| 4,353,463 A * | 10/1982 | Seemann | F16B 13/144 |
| | | | 206/220 |
| 4,395,162 A * | 7/1983 | Murphy | E21D 20/021 |
| | | | 206/219 |
| 4,652,193 A | 3/1987 | Hibbs | |
| 4,706,806 A * | 11/1987 | Mauthe | C04B 41/4853 |
| | | | 206/219 |
| 5,098,228 A * | 3/1992 | Mauthe | E21D 20/026 |
| | | | 206/219 |
| 5,232,774 A | 8/1993 | Otsuka et al. | |
| 5,246,323 A * | 9/1993 | Vernet | F16B 13/061 |
| | | | 411/183 |
| 5,263,804 A | 11/1993 | Ernst et al. | |
| 5,312,215 A * | 5/1994 | Anquetin | F16B 13/061 |
| | | | 411/38 |
| 5,763,026 A | 6/1998 | Makin et al. | |
| 6,393,795 B1 | 5/2002 | Irwin et al. | |
| 6,837,658 B2 * | 1/2005 | Nehl | F16B 13/124 |
| | | | 411/36 |
| 7,708,500 B2 * | 5/2010 | Buquet | F16B 13/061 |
| | | | 405/259.5 |
| 8,186,918 B2 * | 5/2012 | Bucquet | F16B 13/143 |
| | | | 411/38 |
| 8,464,495 B1 | 6/2013 | Feine et al. | |
| 8,585,335 B2 | 11/2013 | Carbonelli | |
| 2009/0092459 A1 * | 4/2009 | Daly | F16B 13/124 |
| | | | 411/80.1 |
| 2011/0094181 A1 | 4/2011 | Hanratty | |

FOREIGN PATENT DOCUMENTS

| | | |
|---|---|---|
| FR | 2 903 784 | 1/2008 |
| FR | 2 917 792 | 12/2008 |
| FR | 3 017 910 | 8/2015 |
| JP | S50 126863 | 10/1975 |

OTHER PUBLICATIONS

French Search Report and Written Opinion for French Patent Application No. 1559172, dated Apr. 27, 2016 (6 pages).
International Preliminary Report on Patentability for International Application No. PCT/US2016/049675, dated Apr. 12, 2018 (6 pages).

* cited by examiner

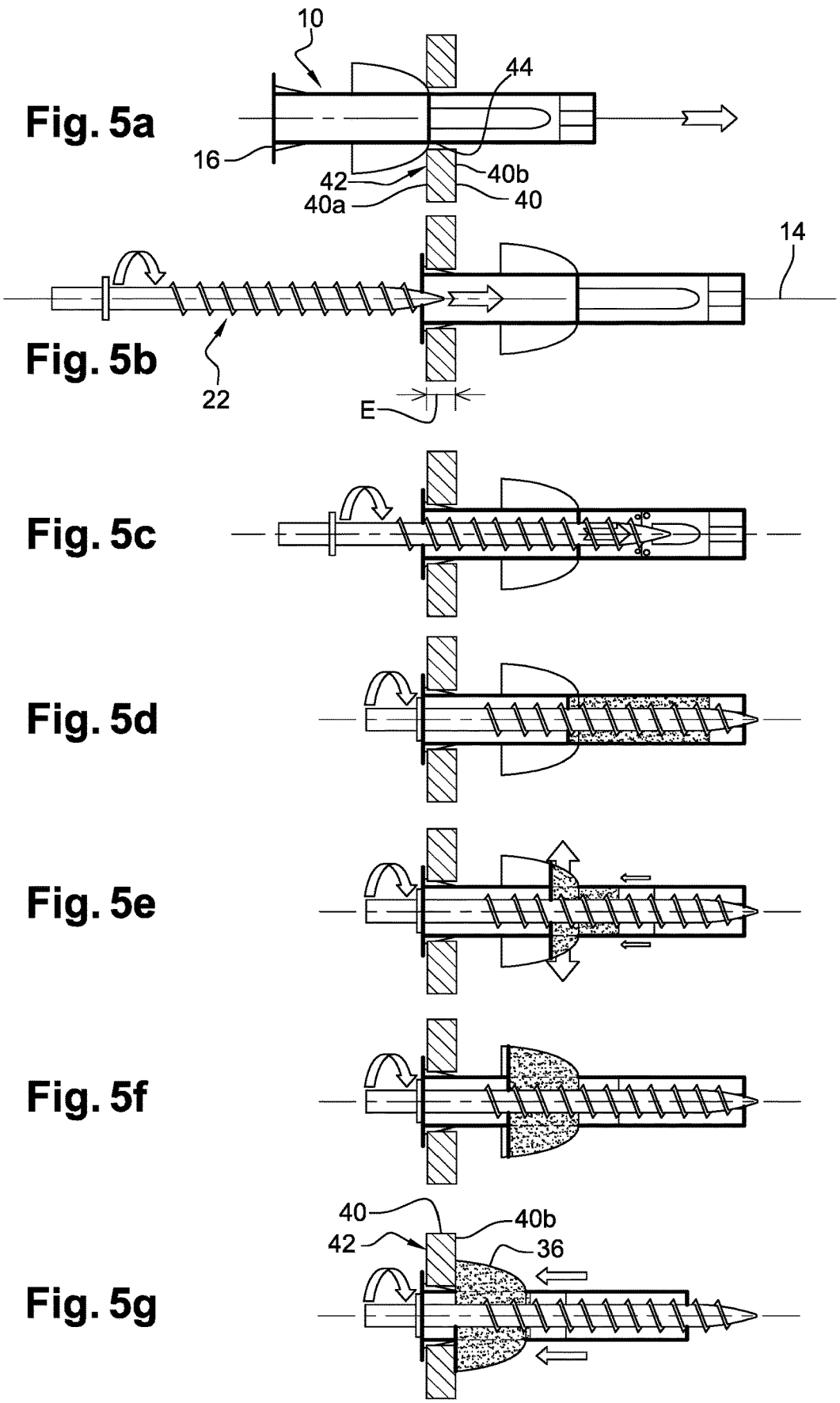

ANCHOR FOR HARDENABLE COMPOUND

PRIORITY CLAIM

This patent application is a national stage entry of PCT Application No. PCT/US2016/049675, which was filed on Aug. 31, 2016, which claims priority to and the benefit of French Patent Application No. 1559172, which was filed on Sep. 29, 2015, the entire contents of which are incorporated herein by reference.

TECHNICAL FIELD

The present disclosure concerns an anchor, in particular a chemical anchor, notably for fastening a component to a support material, and a fastening kit including a screw and such an anchor.

PRIOR ART

The prior art notably includes the documents FR-A1-2 896 283, FR-A1-2 903 784, FR-A1-2 917 792 and FR-A1-3 017 910.

A chemical anchor is an anchor that is fixed to a support material with the aid of a heat-setting resin and a hardener or activator for polymerizing the resin.

At present, there exist chemical anchors for solid materials and chemical anchors for hollow materials.

In the case of a solid material, a hole may be drilled in the solid material, and a capsule of resin may be slid into, the hole, the capsule containing a capillary tube filled with a hardener, before crushing the combination and mixing the two components. It is also possible to drill a hole and to inject into the hole resin and a polymerization hardener or activator that mix inside it. A stud or a screw may serve as fastening element.

In the case of a hollow material, after drilling a hole in the wall of the material, a tubular screen may be inserted into it, after which resin and a hardener are injected, the resin expelled from the screen, and once polymerized, fastening the screen to the rear of the wall. Stud and screw may also be used as fastening elements.

For a hollow material, there is also known an element including a bearing flange to which is attached a split skirt, the skirt being adapted: (i) to be pulled against the rear face of the wall by the link connecting it to the flange bearing against the front face of the wall, and (ii) to receive by injection a mixture of resin and hardener to fasten the element to the rear of the wall.

All the anchors referred to above, which have been known for a long time, are fastened purely chemically. A disadvantage of these chemical anchors is that it is necessary to wait for the mixture of components to be polymerized and to harden before being able to apply a load to the stud or the screw.

With many of these chemical anchors, it is necessary to inject resin, and the applicant has sought to circumvent this relatively laborious injection. Moreover, the applicant has sought to propose a chemical anchor that can not only adapt equally well to a hollow material and to a solid material but whose fastening is no longer purely chemical but also mechanical. It would therefore be feasible to load the screw even before the polymerization of the components is finished.

The applicant has therefore proposed in previous applications FR-A-2 896 283 and FR-A1-2 903 742 a chemical anchor including a perforated tubular envelope adapted to be compressed by a traction element in the form of a screw and including, inside the sheath, a resin component and a hardener component intended to be mixed and to be polymerized by the compression of the sheath to fasten the anchor.

The sheath of the anchor defines an internal housing containing the polymerization components. This housing passes through the entire length of the sheath. The housing is therefore open at each of the longitudinal ends of the sheath. One of the longitudinal ends of the sheath includes an internal screwthread with which the screw is intended to cooperate to cause compression of the sheath and expulsion from the anchor of some of the polymerization components.

The two polymerization components are packaged, generally in glass capsules, which are intended to break and to release their contents when a screw is engaged in the anchor. It is equally possible to package in a capsule only one of the two components. The capsule containing one of the components is embedded in the other component, which is retained inside the sheath by tearable membranes that block the perforations of the sheath. These membranes are produced by the same mold as the sheath and are formed in one piece with the latter. The sheath and its membranes are therefore made from the same material. It has already been proposed to produce these membranes by way of an exterior sleeving surrounding the sheath.

The present disclosure proposes an improvement to the current technique that is simple, effective and economical.

SUMMARY OF THE INVENTION

The present disclosure therefore proposes an anchor for fastening a component to a hollow or solid support material, said anchor comprising a sheath of elongate shape that is intended to be introduced into a hole in said support material, said anchor also comprising a bearing mechanism for bearing against an external face of said support material, said bearing mechanism being situated at a first longitudinal end of said sheath, and a member which is situated at a second, opposite longitudinal end of said sheath and is configured to engage with a screw intended to be introduced into said sheath, characterized in that said piston member is configured to be moved longitudinally inside said sheath by said screw.

The member is therefore similar to a piston able to move longitudinally inside the sheath. The screw is used to move the member. When screwing in the screw, the member is moved away from the second end of the sheath and therefore toward the first end of the sheath. The sheath is not necessarily intended to be deformed upon movement of the member and is therefore able to retain its initial tubular shape. The movement of the member can make it possible to drive a polymerizable resin when the anchor is intended to be used as a chemical anchor. The driving of the resin in the sheath makes it possible to join it up and to compact it, thereby preventing air pockets in the resin. It can moreover make it possible to facilitate the passage of the resin out of the sheath to come into contact with said support material and thereby to favor the chemical fastening of the anchor. It is therefore clear that the movement of the member can drive longitudinal and/or radial movement of the resin relative to the longitudinal axis of the anchor and the sheath.

The anchor in accordance with the present disclosure may comprise one or more of the following features, separately or in combination with one another:

the member is movable in a portion of said sheath that is not deformable or compressible longitudinally, the anchor comprises a stop mechanism configured to engage with said member so as to define an end of travel position inside said sheath, said stop mechanism is carried by or mounted on said sheath; it or they may be mounted to be mobile or displaceable longitudinally on the sheath, said stop mechanism comprise a sleeve made of compressible and elastic material, and preferably configured to be impregnated with or passed through by a polymerizable resin, said member comprises an internal screwthread, the anchor comprises a guide mechanism for longitudinally guiding said member in said sheath, the anchor comprises inside said sheath a one-component or two-component polymerizable resin, such as a resin component and a hardener component, the component(s) of said resin is/are housed in at least one capsule made of tearable or breakable material, a first component is housed in a first capsule which is embedded in a second component housed in a second capsule, said first and second capsules having an elongate form and extending coaxially with one another and with said sheath, said member is situated in the immediate vicinity of said capsule, the anchor comprises inside said sheath an empty cavity extending between said bearing mechanism and said resin, said sheath is perforated and optionally at least partially covered by an outer sleeving made of elastically deformable material, said sheath comprises a first longitudinal portion and a second longitudinal portion extending between said stop mechanism and said first longitudinal portion, said second longitudinal portion being perforated and/or longitudinally compressible, and said second portion not being perforated and/or not being longitudinally compressible.

The present disclosure further concerns a fastening kit, characterized in that it comprises an anchor as described above and a screw.

Said screw advantageously comprises a threaded part, a head, and a non-threaded part extending between said threaded part and said head.

The threaded part preferably has a diameter at least equal to that of a capsule of the anchor, that capsule containing a resin or hardener component.

The present disclosure further concerns a method for fastening a component to a hollow or solid support material by way of a kit, characterized in that it comprises the steps of:

(a) introducing said sheath into a hole in said support material until said bearing mechanism engages with an external face of said support material, (b) inserting said screw into the anchor and screwing it such that it engages with said member and moves it longitudinally inside said sheath.

The method may comprise an additional step of:

(c) continuing to screw said screw until said member engages with the stop mechanism on said anchor, and optionally continuing to screw said screw further until said sleeve bears against an internal face of said support material.

The method may comprise, between steps (a) and (b), a step of introducing into said sheath a polymerizable resin, the movement of said member in step (b) causing at least a part of the resin to move inside and/or outside said sheath.

Alternatively, the method may comprise, in step (b), a sub-step of mixing said resin by way of the screw, the movement of said member in step (b) causing at least a part of the resin to move inside and/or outside said sheath.

The method may comprise, in step (b), a sub-step that includes or consists in bringing a shoulder of said screw to bear directly or indirectly against said bearing mechanism of said anchor.

BRIEF DESCRIPTION OF THE FIGURES

The invention will be better understood and other details, features and advantages of the present invention will become more clearly apparent on reading the following description, given by way of nonlimiting example and with reference to the appended drawings.

FIGS. 5a to 5g are views corresponding to that of FIG. 2 and illustrate steps of a method in accordance with the present disclosure of fastening a component to a hollow support material.

DETAILED DESCRIPTION

Figure 1:
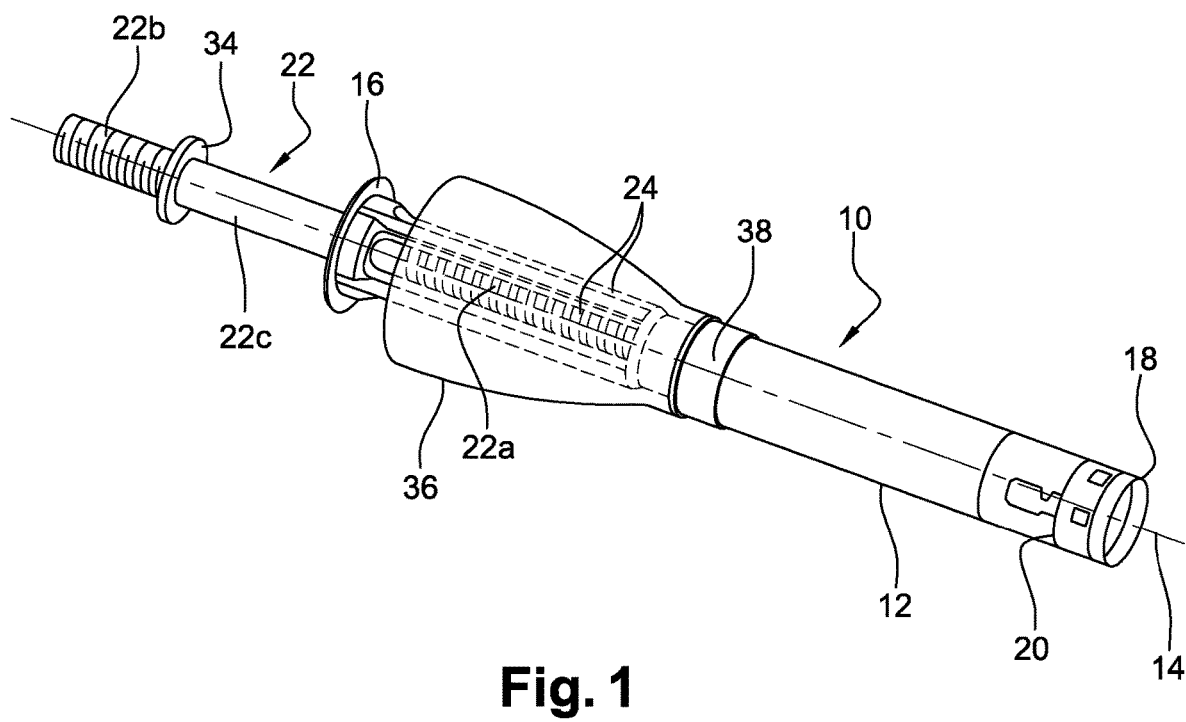
FIG. 1 is a diagrammatic perspective view of a fastening kit in accordance with one embodiment of the present disclosure.
Figure 2:
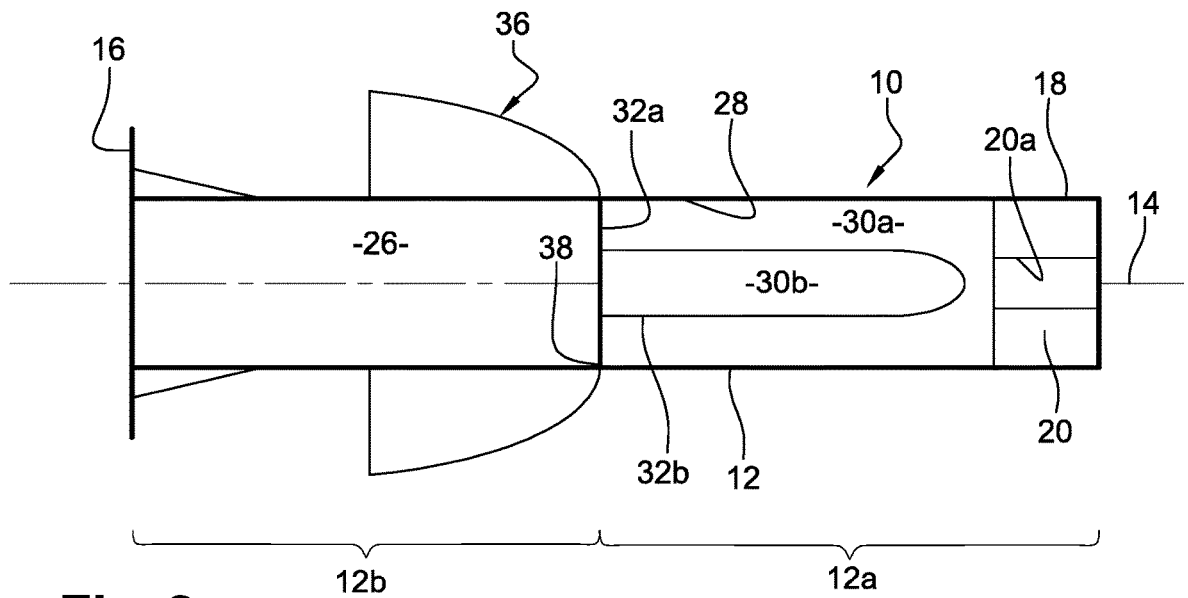
FIG. 2 is a highly diagrammatic view in axial section of one embodiment of the anchor in accordance with the present disclosure.
Figure 4:
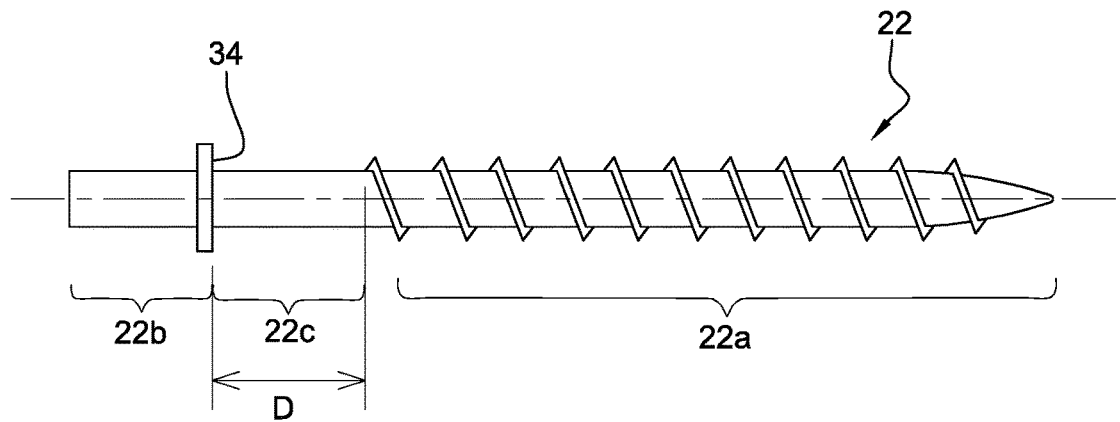
FIG. 4 is a diagrammatic view of a screw in accordance with the present disclosure.

FIGS. 1, 2 and 4 represent a fastening kit in accordance with a first embodiment of the present disclosure that includes an anchor 10, here a chemical anchor, this anchor 10 serving notably for fastening a component to a support material which may be hollow or solid, as will be described in detail with reference to FIGS. 5a to 5g and 6a to 6f, respectively.

The anchor 10 includes a tubular sheath 12, here made of plastic material, having a longitudinal axis 14. The sheath 12 is made from a thermoplastic material, for example, such as polyamide (for example PA6).

The sheath 12 extends between a first end including a bearing mechanism 16 that is formed here by an annular bearing flange, and a second end 18 opposite the flange 16.

A member and in this illustrated example embodiment a piston member 20 is housed in the sheath 12 at the level of its second end 18. In the example represented, this piston member 20 comprises an internal screwthread 20a that may comprise a single rib projecting into the interior of the piston member.

A screw 22 (FIG. 4) is intended to be engaged in the anchor 10 and to be screwed into the piston member 20 in order to cause the piston member 20 to move longitudinally inside the sheath 12. The latter may comprise a guide mechanism for longitudinally guiding the piston member 20. Alternatively, instead of comprising an internal screwthread, the piston member 20 could be made from a solid but flexible material (for example a foam) intended to cooperate with the screw to be moved longitudinally in the sheath.

In the example represented, the sheath 12 comprises two adjacent longitudinal portions: a first portion 12a including the second end 18 and a second portion 12b including the bearing mechanism 16. Here the first portion 12a is formed by a cylindrical envelope that is solid or not perforated, unlike the second portion 12b which is perforated and has slots 24 passing through it in the radial direction relative to the longitudinal axis 14 of the anchor 10 and the sheath 12. The second portion 12b may be covered by an external envelope made of an elastic material, preferably one that can be torn by traction and/or compression.

Here, these openings 24 have a two-fold function. On the one hand they allow polymerizable resin to pass from the interior of the sheath 12 to the exterior, as will be described in more detail hereinafter. They may further allow longitudinal compression of the second portion 12b of the sheath 12.

The second portion 12b defines a cylindrical internal cavity 26 that is empty. On the other hand, the first portion 12a defines a cylindrical internal cavity 28 containing the polymerizable resin.

In a known manner, the resin may be a single-component resin or a two-component resin. It may therefore comprise either a single resin component 30 intended to polymerize in contact with air or moisture, for example, as is the case in FIG. 3, or a resin component 30a and a hardener component 30b intended to be mixed.

Figure 3:
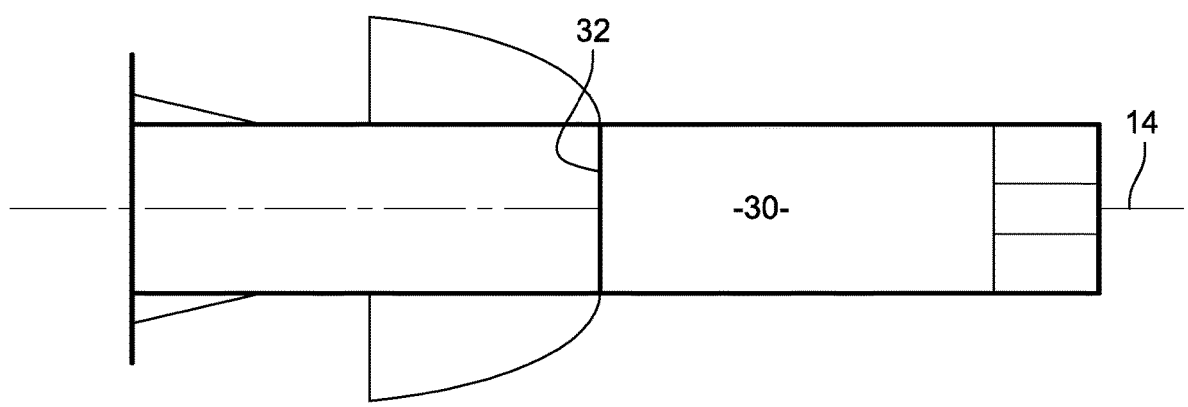
FIG. 3 is a highly diagrammatic view in axial section of a variant embodiment of the anchor in accordance with the present disclosure.

When the resin comprises a single component, that component may be housed in a capsule 32 located in the aforementioned first portion 12a of the sheath 12, as is represented in FIG. 3. This capsule 32 is preferably made from a material that can be torn or broken, for example glass. It is preferably substantially cylindrical and centered on the longitudinal axis 14 of the anchor 10.

When the resin comprises two components, and as represented in FIG. 2, a first component 30b is preferably housed in a first capsule 32b of cylindrical general shape. This capsule is embedded in the second component 30a which is itself housed in a second capsule 32a of cylindrical general shape. The capsules 32a and 32b are advantageously coaxial with each other and with the longitudinal axis 14 of the anchor 10.

The piston member 20 is located in the immediate vicinity of the or one of the capsules 32, 32a, and 32b. As will be explained hereinafter, it is intended to be moved by the screw 22 to move the resin in the sheath 12 and to force it to exit the sheath 12 to come into contact with the support material.

The screw 22, seen better in FIG. 4, essentially comprises three parts: a threaded longitudinal part 22a extending here over a major part of the longitudinal dimension of the screw, a head 22b, and an unthreaded longitudinal part 22c extending between the head and the threaded part.

The head 22b may be of any type: male, female, of circular or polygonal section, etc. It preferably defines a cylindrical bearing shoulder 34 intended for example to cooperate with the flange 16 of the sheath 12. The unthreaded part 22c has a length D.

The diameter of the threaded part 22a is preferably at least equal to that of the first capsule 32b in order to break it.

The thread pitch of this threaded part 22a influences the linear speed of penetration of the screw. The ideal range is between 2.5 and 4.5 mm for example. A smaller value could lead to slow penetration, or even to a risk of jamming in the case of an ISO metric thread. Conversely, too great a pitch risks creating mixing defects (two-component resin) and/or undesirable "dynamic" effects (increased peak torque at end of travel).

In practice, an "attack" at the end of the screw (self-tapping screw type) is highly favorable to the destruction of the capsule 32b.

The anchor 10 further comprises a sleeve 36 mounted on the sheath 12 at a distance from its longitudinal ends. In the example represented, the sleeve 36 has an annular shape and the sheath 12 passes through it. In longitudinal section, sleeve 36 has a substantially frustoconical shape the larger base of which is located on the same side as the bearing mechanism 16 of the anchor 10. The sleeve 36 may be made of foam. It may comprise cells and have a spongy structure.

The anchor 10 further comprises a stop mechanism 38 intended to cooperate with the piston member 20 to limit the piston member's longitudinal travel inside the sheath 12. In the example represented, the stop mechanism 38 is formed at the level of or by the sleeve 36 and in particular at the level of or by the smaller diameter end of the sleeve 36. Here, one of the functions of the sleeve 36 is therefore to limit the travel of the piston member 20 in the sheath 12 when screwing in the screw 22. Alternatively, the stop mechanism could be carried by the sheath 12.

The other functions of the sleeve 36 depend on the use that is made of the chemical anchor 10. In the situation represented in FIGS. 5a to 5g in which the anchor 10 is used in a hollow material, the sleeve 36 is intended to be impregnated with resin. After hardening of the resin, the sleeve 36 bears axially on an internal face 40b of a wall 40 of the support material 42 to improve the anchoring of the anchor 10 in the support material.

In the situation represented in FIGS. 6a to 6e in which the anchor 10 is used in a solid material 42, the sleeve 36 is intended to be compressed radially so as not to impede the introduction of the anchor 10 into the support material.

FIGS. 5a to 5g are described in more detail hereinafter. They illustrate a method of fastening a component to a hollow support material 42 by way of a kit as described above.

The support material 42 may be formed of bricks or blocks, for example. It comprises an exterior wall 40 that is pierced by a hole 44 the diameter of which is slightly larger than the outside diameter of the sheath 12 of the anchor 10. The anchor 10 is introduced into the hole 44 until its flange 16 comes to bear against the external face 40a of the wall 40. The sleeve 36 is preferably made from a compressible elastic material. It is intended to be deformed elastically by compression on introducing the anchor 10 into the hole and then to resume its initial shape after it has passed through the wall 40 of the support material 42 (FIGS. 5a and 5b).

It can be seen in FIG. 5b that the wall 40 has a thickness E less than the distance D. This is not essential but allows the sleeve 36 to return easily to its original shape by virtue of its elasticity.

Then, using a tool (not shown) and an appropriate screwing tip (not shown), the screw 22 is driven in rotation in the anchor 10. The screw 22 is first introduced into the anchor 10 until its tip pierces or breaks the resin capsule or capsules. The fact that the capsule or capsules are coaxial with the axis 14 of the anchor 10 makes it possible on the one hand to facilitate the centering of the screw 22 in the anchor 10 by self-centering and on the other hand to optimize the mixing and the hardening of the resin (FIGS. 5b and 5c).

The free end of the threaded part of the screw 22 begins to be engaged in the piston member 20 and to be screwed into the piston member 20 (FIG. 5d). The head of the screw 22 bears on the flange 16 of the anchor 10. The screwing in of the screw 22 continues, which makes it possible to move the piston member 20 inside the sheath 12 and therefore to move it away from the second end of the sheath 12 (FIG. 5e).

The movement of the piston member 20 on the flange 16 side causes the movement of the resin on the flange side. The screw 22 occupies a non-negligible amount of room inside the sheath 12 so that the resin that moves toward the flange is forced to leave the sheath 12 by passing radially outward through the openings 24 in the sheath 12. The resin then impregnates the sleeve 36 (FIGS. 5e and 5f). The end of travel position of the piston member 20 is defined by the sleeve 36, as mentioned above (FIG. 5f).

The user who is screwing in the screw 22 can then feel the screwing torque increase because of the resistance associated with the piston member 20 bearing on the sleeve 36.

The user can continue to screw in the screw 22 so that the sheath 12 is deformed by longitudinal compression of its second portion 12b. This deformation ends when the sleeve 36 comes to bear longitudinally on the internal face 40b of the support material 42. The user then feels a significant increase in the screwing torque of the screw 12 which indicates that the installation of the fastening screw 22 has finished.

FIGS. 6a to 6f are described in more detail hereinafter. They illustrate a method of fastening a component to a solid support material using a kit as described above.

Figure 6A:
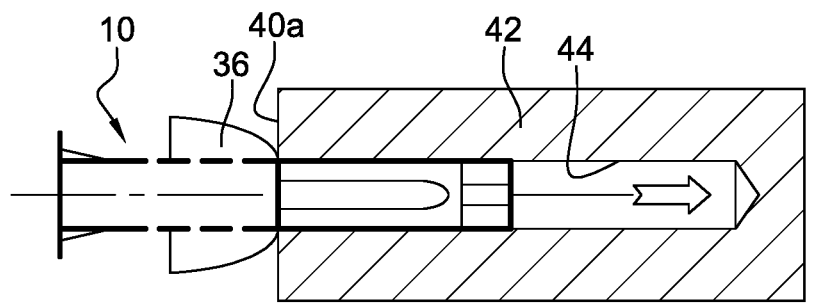
FIGS. 6a to 6f are views corresponding to that of FIG. 2 and illustrate steps of a method in accordance with the present disclosure of fastening a component to a solid support material.
Figure 6B:
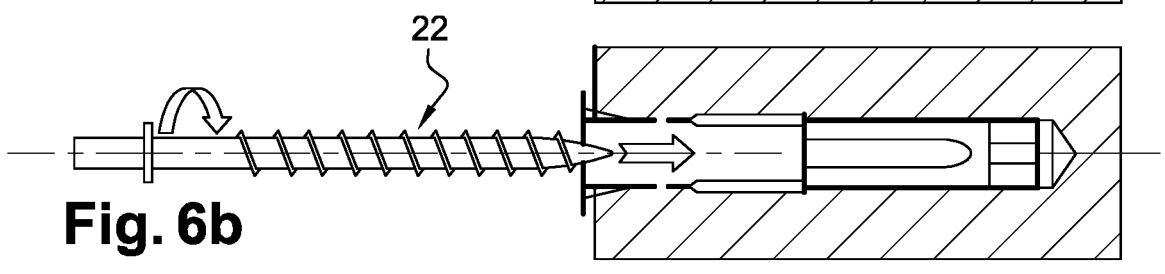

A hole 44 whose diameter is slightly greater than the outside diameter of the sheath 12 of the anchor 10 is drilled in the support material 42. The anchor 10 is introduced into the hole 44 until its flange 16 bears against the external face 40a of the support material 42. The sleeve 36 is intended to be deformed elastically in compression on introduction of the anchor 10 into the hole and to remain compressed once inserted into the hole (FIGS. 6a and 6b).

Then, using a tool (not shown) and an appropriate screwing tip (not shown), the screw 22 is driven in rotation in the anchor 10. The screw 22 is first introduced into the anchor 10 until its tip pierces or breaks the capsule or capsules of resin.

Figure 6C:
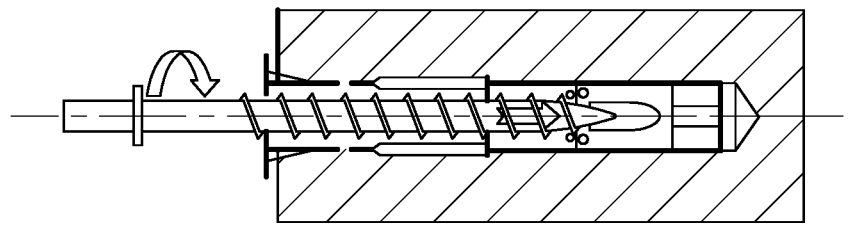
Figure 6D:
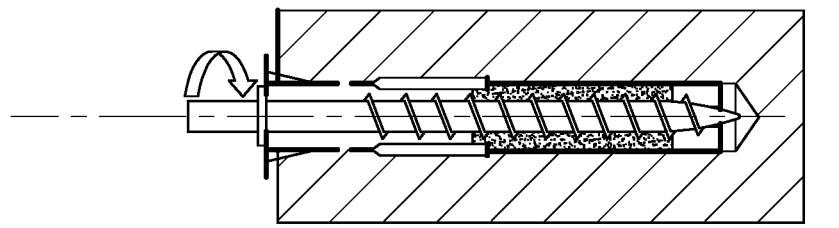
Figure 6E:
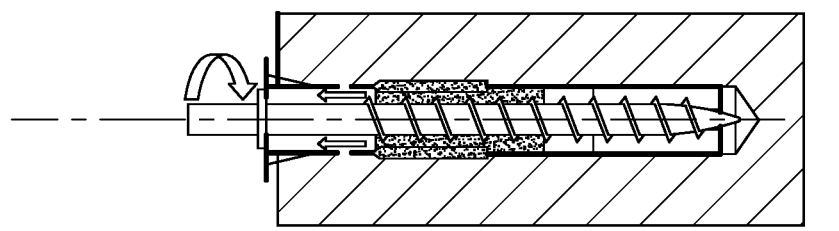
Figure 6F:
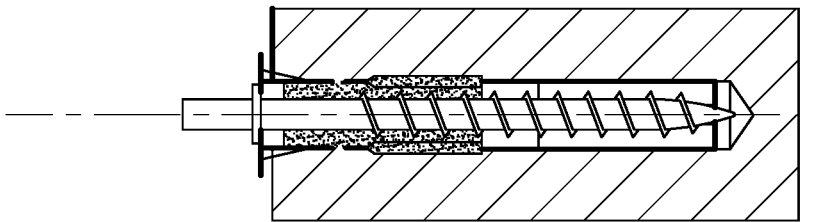

The free end of the threaded part of the screw 22 begins to be engaged in the piston member 20 and to be screwed into the piston member 20 (FIGS. 6c and 6d). The head of the screw 22 comes to bear on the flange 16 of the anchor 10. The screw 22 continues to be screwed in which makes it possible to move the piston member 20 inside the sheath 12 and therefore to move it away from the second end of the sheath 12 (FIG. 6d).

The movement of the piston member 20 on the flange 16 side causes the movement of the resin on the flange 16 side. The screw 22 occupies a non-negligible amount of room inside the sheath 12 so that the resin that is moved toward the flange is forced to leave the sheath by passing radially outward through the openings 24 in the sheath 12. The resin passes through the openings in the second portion of the sheath 12 and does not necessarily impregnate the sleeve 36. The end of travel position of the piston member 20 is defined by the sleeve 36, as mentioned above (FIGS. 6e and 6f).

The user who is screwing in the screw 22 can then feel that the screwing torque increases because of the resistance associated with the piston member 20 bearing on the sleeve 36. In this position, the resin has filled a sufficient volume in the sheath 12 (and specifically the aforementioned empty cavity of the sheath 12) and is in contact with the cylindrical internal surface of the hole 44, which anchors the anchor 10 in the support material. In this case it is therefore not necessary or even possible to screw the screw 22 in further to compress the anchor 10 longitudinally.

FIGS. 7 to 10 represent variants embodiments of the present disclosure in which the anchors are intended to be filled with resin when used. They are therefore not prefilled as is the case in the examples from FIGS. 2 and 3.

Figure 7:
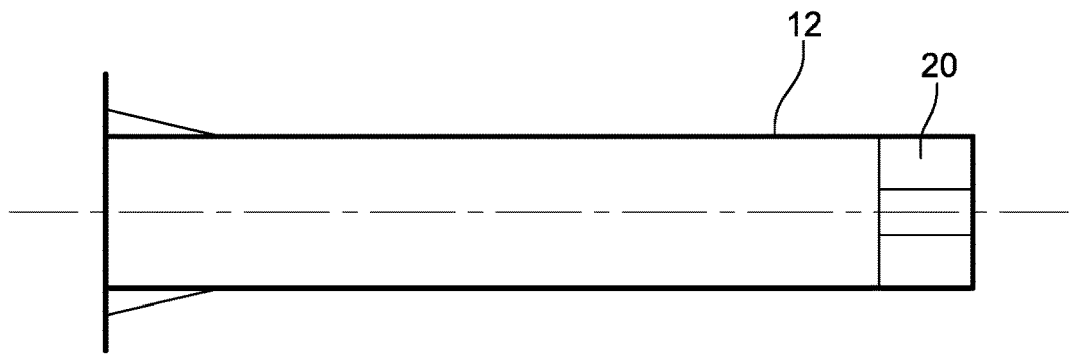
FIGS. 7 to 9 are highly diagrammatic views in axial section of the anchor in accordance with variant embodiments of the present disclosure.

In the case of FIG. 7, the anchor comprises the aforementioned sheath 12 and the aforementioned piston member 20 but there is no sleeve.

Figure 8:
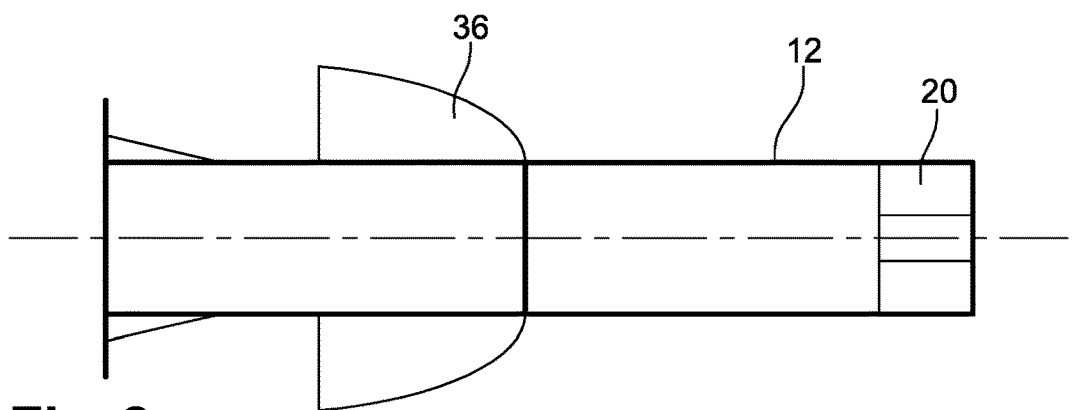

In the case of FIG. 8, the anchor comprises the sheath 12, the member 20 and the sleeve 36.

Figure 9:
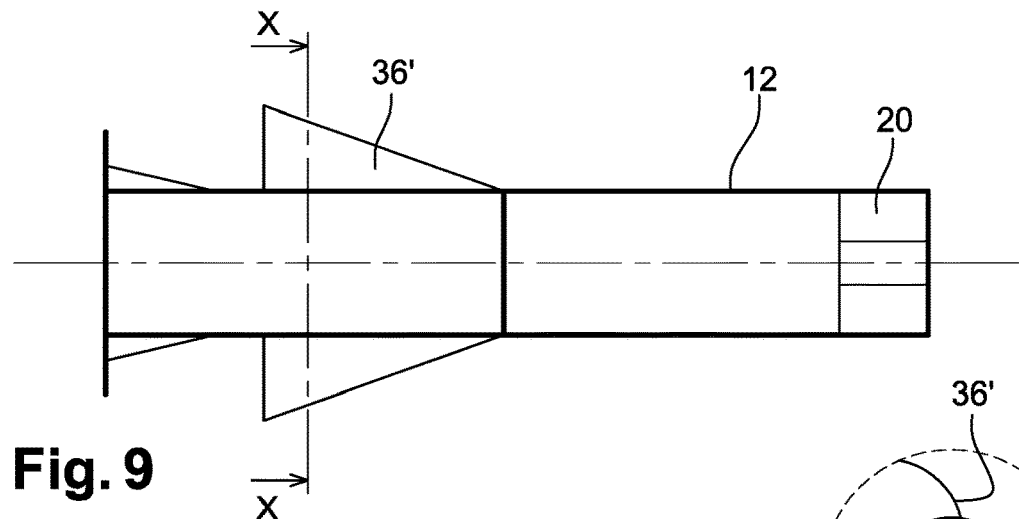
Figure 10:
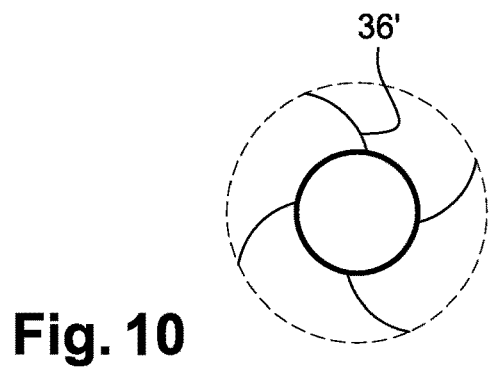
FIG. 10 is a view in section taken along the line X-X in FIG. 9.

In the case of FIGS. 9 and 10, the anchor comprises the sheath 12 and the member 20. On the other hand, the sleeve 36' has a configuration different from that of the previous figure. Here the sleeve 36' comprises an annular row of curved or helicoidal webs that are elastically movable in radial compression and allow resin to pass between them. They are intended to be bent over the cylindrical external surface of the sheath when inserting the anchor into a hole and to resume their initial position on leaving this hole in the case of a hollow material. The advantage of such a sleeve is that it can be made more easily in one piece with the sheath.

Figure 11A:
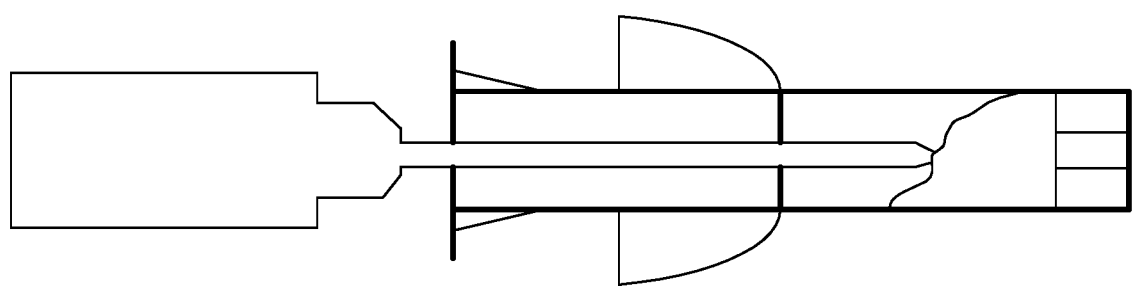
FIGS. 11a and 11b are views corresponding to that of FIG. 8 and illustrate steps of a method in accordance with the present disclosure for fastening a component to a support material.
Figure 11B:
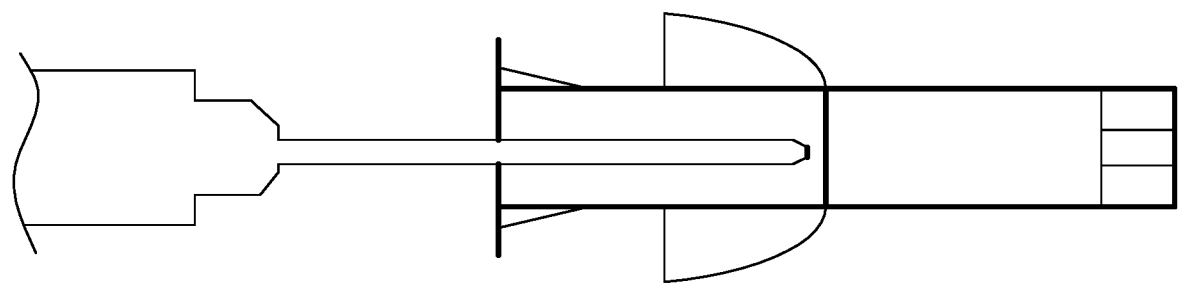

FIGS. 11a and 11b show steps of use of the anchor from FIG. 8, and in particular of injection of resin into the anchor. In the usual way, this injection takes place before or after insertion of the anchor into the hole in a support material and before the insertion of a screw into the anchor. The resin may be a single-component resin or a two-component resin, as mentioned above.

The invention claimed is:

1. A chemical anchor for fastening a component to a hollow or solid support material, said chemical anchor comprising:
   an elongated sheath configured to be inserted into a hole in the support material, the elongated sheath including a bearing mechanism configured to bear against an external face of the support material, the bearing mechanism situated at a first end of the sheath; and
   a member situated inside of the sheath and spaced apart from the bearing mechanism, the member engagable by a screw inserted in the sheath, the member movable inside of the sheath by the screw along a longitudinal axis of the sheath.

2. The chemical anchor of claim 1, which includes a stop mechanism configured to engage with the member to define an end of a travel position for the member inside of the sheath.

3. The chemical anchor of claim 2, wherein the stop mechanism is mounted on the sheath.

4. The chemical anchor of claim 2, wherein the stop mechanism includes a sleeve made of compressible and elastic material.

5. The chemical anchor of claim 4, wherein the stop mechanism is configured to be impregnated with or passed through by a polymerizable resin.

6. The chemical anchor of claim 2, wherein the stop mechanism is configured to be impregnated with or passed through by a polymerizable resin.

7. The chemical anchor of claim 1, wherein the member has internal threads.

8. The chemical anchor of claim 1, which includes a member guide mechanism in the sheath.

9. The chemical anchor of claim 1, which includes a one-component polymerizable resin in the sheath.

10. The chemical anchor of claim 9, wherein the resin is housed in a capsule made of tearable or breakable material.

11. The chemical anchor of claim 10, wherein the member is situated in an immediate vicinity of the capsule.

12. The chemical anchor of claim 9, wherein the sheath defines an empty cavity extending between the bearing mechanism and the resin in the sheath.

13. The chemical anchor of claim 9, wherein the sheath is perforated, and at least partially covered by an outer sleeve made of an elastically deformable material.

14. The chemical anchor of claim 9, wherein the sheath includes a first longitudinal portion and a second longitudinal portion extending between the bearing mechanism and the first longitudinal portion, the second longitudinal portion being perforated and/or longitudinally compressible, and the first longitudinal portion not being perforated and/or not being longitudinally compressible.

15. The chemical anchor of claim 1, which includes a two-component polymerizable resin inside the sheath.

16. The chemical anchor of claim 15, wherein the components of the resin are housed two capsules.

17. The chemical anchor of claim 16, wherein the two capsules are each made of tearable or breakable material.

18. The chemical anchor of claim 17, wherein the first and second capsules each have an elongated form and extend coaxially with respect to one another and with respect to the sheath.

19. The chemical anchor of claim 16, wherein the member is situated in an immediate vicinity of one of the capsules.

20. The chemical anchor of claim 15, wherein a first one of the components of the resin is housed in a first capsule that is embedded in a second component of the resin housed in a second capsule.

21. The chemical anchor of claim 15, wherein the sheath defines an empty cavity extending between the bearing mechanism and the resin in the sheath.

22. The chemical anchor of claim 15, wherein the sheath is perforated, and at least partially covered by an outer sleeve made of elastically deformable material.

23. The chemical anchor of claim 15, wherein the sheath includes a first longitudinal portion and a second longitudinal portion extending between the bearing mechanism and the first longitudinal portion, the second longitudinal portion being perforated and/or longitudinally compressible, and the first longitudinal portion not being perforated and/or not being longitudinally compressible.

24. A fastening kit comprising:
a chemical anchor for fastening a component to a hollow or solid support material, the chemical anchor including:
an elongated sheath configured to be inserted into a hole in the support material, the elongated sheath including a bearing mechanism configured to bear against an external face of the support material, the bearing mechanism situated at a first end of the sheath, and
a member situated inside of the sheath and spaced apart from the bearing mechanism, the member engagable by a screw inserted in the sheath, the member movable inside of the sheath by the screw along a longitudinal axis of the sheath; and
a screw insertable in the sheath.

25. The fastening kit of claim 24, wherein the screw includes a threaded part, a head, and a non-threaded part extending between the threaded part and the head.

26. A chemical anchor for fastening a component to a hollow or solid support material, said chemical anchor comprising:
an elongated sheath configured to be inserted into a hole in the support material, the elongated sheath including a bearing mechanism configured to bear against an external face of the support material, the bearing mechanism situated at a first end of the sheath;
a member in the sheath and spaced apart from the bearing mechanism, the member engagable by a screw inserted in the sheath, the member movable longitudinally in the sheath by the screw; and
a stop mechanism configured to engage with the member to define an end of a travel position for the member in the sheath, wherein the stop mechanism includes a sleeve made of compressible and elastic material.

27. A chemical anchor for fastening a component to a hollow or solid support material, said chemical anchor comprising:
an elongated sheath configured to be inserted into a hole in the support material, the elongated sheath including a bearing mechanism configured to bear against an external face of the support material, the bearing mechanism situated at a first end of the sheath;
a member in the sheath and spaced apart from the bearing mechanism, the member engagable by a screw inserted in the sheath, the member movable longitudinally in the sheath by the screw; and
a stop mechanism configured to engage with the member to define an end of a travel position for the member in the sheath, wherein the stop mechanism is configured to be impregnated with or passed through by a polymerizable resin.

28. A chemical anchor for fastening a component to a hollow or solid support material, said chemical anchor comprising:
an elongated sheath including at least one perforation and configured to be inserted into a hole in the support material, the elongated sheath including a bearing mechanism configured to bear against an external face of the support material, the bearing mechanism situated at a first end of the elongated sheath;
an outer sleeve made of an elastically deformable material and configured to at least partially cover the elongated sheath;
a one-component polymerizable resin housed in the sheath; and
a member in the sheath and spaced apart from the bearing mechanism, the member engagable by a screw inserted in the sheath, the member movable longitudinally in the sheath by the screw.

29. A chemical anchor for fastening a component to a hollow or solid support material, said chemical anchor comprising:
an elongated sheath including at least one perforation and configured to be inserted into a hole in the support material, the elongated sheath including a bearing mechanism configured to bear against an external face of the support material, the bearing mechanism situated at a first end of the elongated sheath;
an outer sleeve made of an elastically deformable material and configured to at least partially cover the elongated sheath;

a two-component polymerizable resin housed in the sheath; and a member in the sheath and spaced apart from the bearing mechanism, the member engagable by a screw inserted in the sheath, the member movable longitudinally in the sheath by the screw.

\* \* \* \* \*